United States Patent [19]

Dorsey et al.

[11] 3,855,497

[45] Dec. 17, 1974

[54] DUAL BIAS CONTROLLED STORAGE TUBES

[75] Inventors: Denis Peter Dorsey, Levittown, Pa.; William E. Rodda, Trenton, N.J.

[73] Assignee: RCA Corporation, New York, N.Y.

[22] Filed: Mar. 1, 1973

[21] Appl. No.: 337,012

[30] Foreign Application Priority Data

Apr. 24, 1972 Great Britain .................... 19020/72

[52] U.S. Cl. ...................................... 315/30, 315/12

[51] Int. Cl. ............................................ H01j 29/70

[58] Field of Search ......... 315/31 R, 30, 12, 10, 11, 315/22, 18

[56] References Cited

UNITED STATES PATENTS

| | | | |
|---|---|---|---|
| 3,426,238 | 2/1969 | Gibson | 315/12 |
| 3,433,997 | 3/1969 | Bidese | 315/30 |
| 3,562,557 | 2/1971 | Gates | 315/30 |
| 3,754,159 | 8/1973 | Andrews | 315/31 R |

*Primary Examiner*—Maynard R. Wilbur
*Assistant Examiner*—J. M. Potenza
*Attorney, Agent, or Firm*—Eugene M. Whitacre; Charles I. Brodsky

[57] ABSTRACT

In response to the application of a predetermined signal, the bias on the control grid of a storage tube is altered to switch its electron scanning beam from a substantially unblanked condition to a substantially blanked condition. When employed in communications systems of the type in which television images are to be "frozen" in a first storage tube for subsequent transmission on an individual frame basis by a voice-quality telephone link for example, and in which the image is to be subsequently re-created by a second such tube, the control signal indicates whether the user's storage tube is being operated in either its "transmit" or "receive" mode. As will be seen, the electron scanning beam of his storage tube will be in its substantially unblanked condition when it is used in the "transmit" mode of operation, but will be in its substantially blanked condition when it is used in the "receive" mode of operation.

5 Claims, 1 Drawing Figure

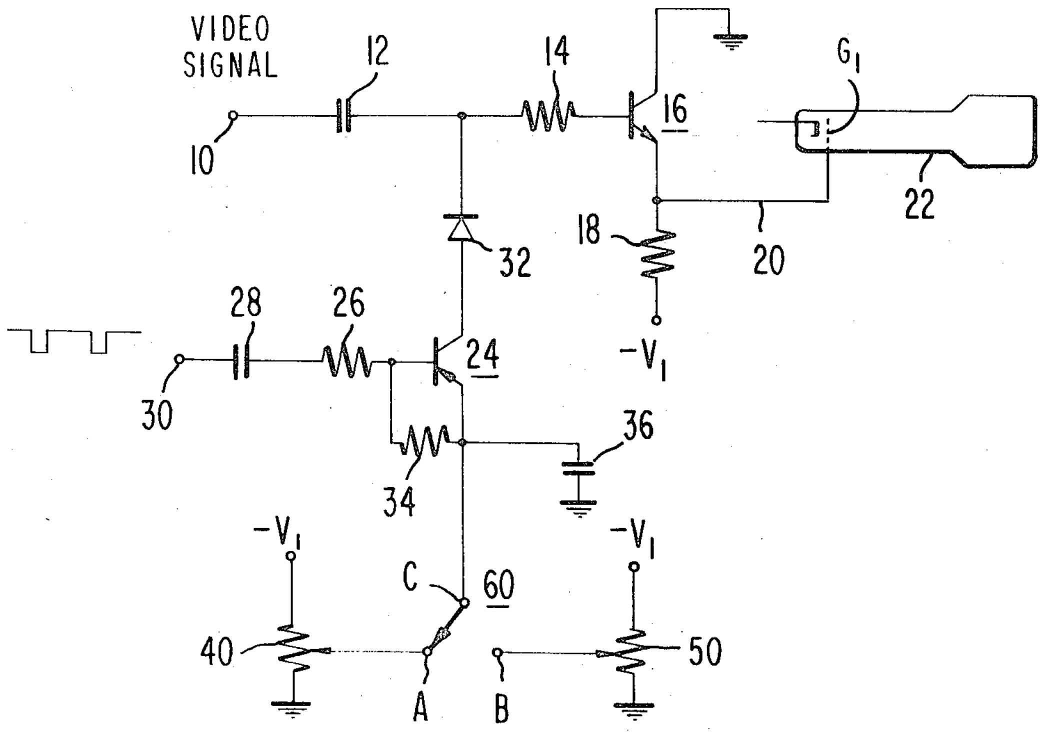
VIDEO SIGNAL
10
12
14
16
G1
22
18
20
-V1
32
28
26
24
30
36
34
-V1
-V1
C
60
40
50
A
B

DUAL BIAS CONTROLLED STORAGE TUBES

FIELD OF THE INVENTION

Pending U.S. Pat. Application Ser. No. 257,412, filed May 26, 1972, and entitled "TELEPHONE IMAGE TRANSMISSION SYSTEM" describes a system which is capable of transmitting still television pictures of three-dimensional objects over communications channels such as long-distance unequalized voice-grade telephone lines. A television camera is therein employed to continually provide a video signal to a storage tube in which any one video frame of information can be "frozen." The single frame stored—i.e., the picture to be transmitted—is then converted to an audio frequency signal for transmission over telphone type communications links to a remote receiver location, where a second storage tube is used to store the audio frequency information transmitted. Upon completion of the transmission, the audio information stored at the receiver is converted back to a video signal for viewing on a monitor. The transmitted signal is essentially frequency modulated, in that its instantaneous frequency is directly proportional to the brightness level of the stored picture element then being transmitted.

Such a transmission system has been termed "simplex," in that transmissions always travel in the same direction along the telephone link. In a "half-duplex" system, on the other hand, transmissions can proceed in either direction, but not simultaneously. Experimentation has shown that "half-duplex" system performance can be enhanced when the storage tube alternatively used both for the transmission and re-creation of information is biased to a first condition when the "transmit" mode of operation is intended to a second, different condition when the "receive" mode of operation is desired.

To be more specific, when the storage tube is used to "freeze" to television frame for transmission, substantially the entire television picture is scanned across its target area, and thereby stored, in approximately one-thirtieth of a second. When the storage tube is used instead in re-creating a transmission, the amplitude modulated pulses received via the telephone link complete the recording of the frame information in approximately 60 seconds. As will be readily apparent, each element of the storage tube target need be contacted only once in order to store the information, i.e., the picture to be "frozen" before subsequent transmission or the amplitude modulated pulse components received for ultimate viewing at the end of the 60-second period.

However, whereas each element of the storage tube target is traversed only onece by the scanning beam in the "freezing" of a television frame for transmission, those same elements are repetitively traversed by the beam in the storing of a picture received along the communications link. Although the manner of recording this received information content employs an arrangement which utilizes controlled sampling techniques to gate the beam and reconstruct the information on a point-by-point basis in each line of each column stored, the possibility exists that even without additional modulation, the repetitive scanning of target areas already supporting a stored charge could significantly alter the ultimate pattern on the target bacause of the deposition of added charge each time the scanning beam traverses such areas in laying down its charge for a subsequent point in any given line.

Assuming that the energy of the signals applied to the storage tube control grid is the same in either of its modes of operation, it will be appreciated that unless the voltage level from which this energy extends was substantially lower in the "receive-re-create" mode as contrasted with the "select-transmit" modes, then over the 60-second period needed for complete recording of the received information, a series of like, non-picture representative charges could accumulate throughout the target elements of the storage tube, and thereby reduce the amount of usable information which is retained. Such a problem is not generally presented in the "select-transmit" mode because the storage tube is not continually scanned in the controlled sampling manner in putting down the matrix charge pattern representative of the information content.

SUMMARY OF THE INVENTION

As will become clear hereinafter, the present invention comprises bias control apparatus for the control grid of the storage tube. In a first mode of operation, the apparatus serves to apply to that grid a first bias voltage which maintains the scanning beam of the tube in a substantially unblanked condition. The apparatus, however, in a second mode of operation, serves to apply a second, more negative bias voltage to the grid so as to maintain the scanning beam substantially blanked. With the first bias voltage arrangement, applied input signals from a television camera deposit the charge pattern of an object image onto the storage tube target, ready for subsequent transmission along the audio communication link. With the second bias voltage arrangement, on the other hand, the charge pattern is only laid down when the amplitude With the second bias voltage arrangement, on the other hand, the change pattern is only laid down when the amplitude modulated pulses one applied, containing information components to increase the bias voltage on the control grid to substantially the first level and one representative of the audio information transmitted. In one preferred embodiment of the invention to be described, the apparatus was selected to reduce the bias voltage on the control grid from an approximate −60 volt level—when the storage tube is used in the selection and transmission of the video frame information—to a −100 volt level—when the tube is used in re-creating the amplitude modulated pulses received along the audio link.

BRIEF DESCRIPTION OF THE DRAWING

These and other features of the present invention will be more clearly understood from a consideration of the following description taken in connection with the accompanying drawing which shows a preferred embodiment of storage tube bias apparatus constructed in accordance with the invention.

DETAILED DESCRIPTION OF THE DRAWING

In the drawing, the signal to be stored—either from the television camera prior to transmission as a "frame-freeze" image or from the audio communications link to be re-created—is applied via an input terminal 10, a capacitor 12, and a resistor 14 to the base electrode of a first transistor 16, shown as being of NPN type. The collector electrode of transistor 16 is directly connected to a point of reference or ground potential, while its emitter electrode is coupled, first, by a resistor 18 to a source of operating potential $-V_1$ and, second, via a link 20 to the control grid electrode $G_1$ of the system storage tube 22 for writing on the storage tube. A second transistor 24, of PNP type, is also included, with its base electrode being coupled by means of a resistor 26 and a capacitor 28 to receive a train of horizontal rate pulses, provided from the synchronizing generator or similar such apparatus included within the telephone transmission system. A semiconductor rectifier 32 is further included, with its anode electrode directly connected to the collector electrode of transistor 24 and with its cathode electrode connected to the junction of capacitor 12 with resistor 14, the construction being then essentially completed by the addition of a resistor 34 between the base and emitter electrodes of transistor 24 and a capacitor 36 serving to bypass that emitter electrode to ground.

In accordance with the present invention, a pair of potentiometers 40 and 50 are shown coupled between the $-V_1$ source and ground, to bias the control grid $G_1$ to such voltage as will substantially blank or unblank the scanning beam of the storage tube 22. More particularly, a relay 60 is employed, having one contact A coupled to the variable arm of potentiometer 40, a second contact B coupled to the variable arm of potentiometer 50, and a contact C connected to the emitter electrode of transistor 24. As will be appreciated, one of these two potentiometers, e.g., 40, is arranged to establish a direct voltage at the emitter electrode of transistor 24 as will assist in biasing the control grid $G_1$ to that level at which the scanning beam will be substantially unblanked—the video signal components supplied at terminal 10 and coupled to this grid will then modulate the scanning beam to develop the charge pattern on the target of the storage tube for its transmission to the remote receiver location. It will also be appreciated that the other potentiometer, in this case, 50, serves to establish that direct voltage at the emitter electrode of transistor 24 as will bias the control grid $G_1$ to maintain the scanning beam substantially blanked—at least until the storage tube 22 is driven to its operating region by amplitude modulated pulses then being applied at input terminal 10. In this preferred embodiment of the invention, the relay 60 is conditioned to apply either the direct voltage from its contact A or its contact B to the emitter electrode of transistor 24 depending upon whether the storage tube is to operate in its "select-transmit" mode or in its "receive-recreate" mode.

In operation, it will be seen that the negative going horizontal rate pulses applied at terminal 30 are in a direction to render PNP transistor 24 conductive. When this transistor turns "on" in response, the selected direct current level developed at its emitter circuit is applied by rectifier 32 to the junction of input capacitor 12 and resistor 14. Because the emitter follower configuration of transistor 16 presents a high input impedance and because transistor 24 is rendered conductive only at a horizontal rate, the capacitor 12 will essentially retain that direct current level and provide the bias voltage for the $G_1$ grid of storage tube 22 via the base-emitter junction of transistor 16. Because transistor 16 is direct current coupled to the control grid by the link 20, the bias voltage provided will equal the direct current level established in the emitter circuit of transistor 24, less the correspondingly smaller voltage drops in the components 14, 16, 24, 32.

In order to store a full frame of television information, i.e., to store from the camera prior to transmission along the audio communications link, the variable arm of potentiometer 40 is adjusted between the $-V_1$ and ground potentials until a bias voltage of −60 volts is applied to the control grid $G_1$. With peak-to-peak signal informations of approximately 10 volts being then applied to the $G_1$ grid, a charge pattern representative of the information content will be written onto the target surface. For the case where the electron scanning beam of the silicon storage tube is to be substantially blanked—that is, in re-creating the transmitted information received on a pulse-by-pulse basis—the variable arm of potentiometer 50 is adjusted between its $-V_1$and ground potentials until the bias voltage provided the $G_1$ grid is decreased to a −100 volt level. The amplitude of the applied information signal at terminal 10 should be correspondingly increased in this mode of operation in order to overcome the added negative bias on the grid, and an arrangement for going so upon this switch-over in operation is disclosed in our pending application Ser. No. 273,534, filed July 20, 1972, and entitled "VIDEO FREQUENCY AMPLIFIER OPERABLE IN EITHER OF TWO BIAS CONDITIONS", reflied as a continuation-in-part application Ser. No. 398,853, Sept. 19, 1973. Because this increase in pulse amplitude could tend to overcome the collector-base reverse bias on transistor 24, the rectifier 32 is included to act as a protection device.

After these initial potentiometer adjustments are set, the switching of relay 60 between its A and B contacts automatically provides the correct bias voltage for the control grid of the storage tube for either mode of operation desired. The application of a beam unblanking voltage to the grid during the "frame freeze" mode of operation presents little problem respecting the undesired accumulation of changes on the target surface, because each element is scanned only once in estalishing the desired charge pattern. In the "slow-scan, receive mode," the charges that would tend to accumulate on each element due to its integration characteristics on repetitive scansions are prevented from being so deposited because of the blanked condition of the beam, except for that one instant of scan when the tube is gated to conduction by the information content sampling pulse. Actuation of the relay 60 between its A and B contacts is manually controlled by the user of the image transmission equipment, depending upon whether he wishes to transmit a television picture or receive one being transmitted to him along the telphone link.

While applicant does not wish to be limited to any particular set of values, the following have proven satisfactory in one operating arrangement of the invention.

| Component | Value |
|---|---|
| Resistor 14 | 47 ohms |
| Resistor 18 | 8.2 kilohms |
| Resistor 26 | 3.6 kilohms |
| Resistor 34 | 10 kilohms |
| Capacitor 12 | 0.47 microfarads |
| Capacitor 28 | 1.0 microfarads |
| Capacitor 36 | 1.0 microfarads |
| Rectifier 32 | 1N661 |

-Continued

| Component | Value |
|---|---|
| Transistor 16 | 2N3440 |
| Transistor 24 | 2N4036 |
| Potential Source $-V_1$ | −200 volts |

While there has been described what is considered to be a preferred embodiment of the present invention for altering the bias level of the control grid of a silicon storage tube, it will be readily apparent that other modifications may be made by those skilled in the art without departing from the teachings herein.

What is claimed is:

1. In a television image transmission system of the type wherein a single storage tube having an electron beam scanning a target is employed both for the selection of a particular frame of television information for transmission to a remote receiver location by an audio communications link and for the reception and recreation of frame information so transmitted, and further of the type wherein image representative television information video or pulse signals are applied to the control grid of said storage tube for the selection or recreation of said information dependent upon whether said tube is operating in the transmitting or in the receiving mode, the combination therewith of:

first and second sources of operating potential;

means for applying a bias voltage to the control grid of said storage tube; and control means for coupling said first source of operating potential into circuit connection with said aforementioned means to bias the control grid of said tube to a direct current level to unblank the unmodulated scanning beam thereof when said storage tube is employed to select a particular television frame for transmission, thereby enabling said video signals to modulate said beam to develop a charge pattern on said target for transmission to said remote receiver location, and for coupling said second source of operating potential into circuit connection with said aforementioned means to bias the control grid of said tube to a different direct current level to blank the unmodulated scanning beam thereof when said storage tube is employed to re-create a television frame received along said audio communications link, thereby enabling amplitude modulations of said pulse signals to drive said tube into its operating region for re-creation of the pulse informations received;

with said control means being actuated for the coupling of said first or said second sources of operating potential depending upon whether said storage tube is to operate in its transmitting or receiving mode, respectively.

2. The combination of claim 1 wherein said bias voltage applying means includes a pair of transistors, one of which is arranged in a common collector configuration having an emitter electrode direct current coupled to the control grid of said storage tube and the other of which is connected in a common emitter configuration having a collector electrode coupled to the base electrode of said one transistor and an emitter electrode coupled to said control means.

3. The combination of claim 2 wherein said image representative television information signals are coupled to the base electrode of said one transistor for translation thereby to the control grid of said storage tube and wherein horizontal rate scanning pulses are coupled to the base electrode of said outer transistor to render said transistor conductive at said horizontal rate.

4. The combination of claim 3 wherein said first source of operating potential includes a potentiometer for developing a first voltage and wherein said second source of operating potential includes a potentiometer for developing a second, more negative voltage.

5. The combination of claim 4 wherein the collector electrode of said other transistor is coupled to the base electrode of said one transistor via a semiconductor rectifier, poled to prevent a high impedance to said image representative television information signals applied to the base electrode of said one transistor for translation thereby to the control grid of said storage tube.

* * * * *

UNITED STATES PATENT OFFICE

CERTIFICATE OF CORRECTION

Patent No. 3,855,497 Dated December 17, 1974

Inventor(s) Denis Peter Dorsey and William E. Rodda

It is certified that error appears in the above-identified patent and that said Letters Patent are hereby corrected as shown below:

Column 1, line 39, that portion reading "to" should read --a--;
Column 1, line 54, that portion reading "omece" should read --once--;
Column 2, line 34, that portion reading "communication" should read --communications--;
Column 2, lines 34-36, that portion starting with "with" and concluding with "amplitude" , should delete first of two identical portions;
Column 2, line 38, that portion reading "change" should read --charge--;
Column 2, line 39, that portion reading "one" should read --are--;
Column 4, line 22, that portion reading "going" should read --closing--;
Column 4, line 26, that portion reading "reflied" should read --refiled--;
Column 4, line 39, that portion reading "changes" should read --charges--;
Column 6, line 27, that portion reading "outer" should read --other--;
Column 6, line 38, that portion reading "prevent" should read --present--.

Signed and Sealed this

*fourth* Day of *November 1975*

[SEAL]

*Attest:*

RUTH C. MASON
*Attesting Officer*

C. MARSHALL DANN
*Commissioner of Patents and Trademarks*